(12) United States Patent
Saitoh et al.

(10) Patent No.: US 9,753,198 B2
(45) Date of Patent: Sep. 5, 2017

(54) LIGHT EMITTING SCREEN AND DISPLAY APPARATUS

(71) Applicant: FUJIFILM Corporation, Tokyo (JP)

(72) Inventors: Yukito Saitoh, Kanagawa (JP); Yujiro Yanai, Kanagawa (JP); Akiko Watano, Kanagawa (JP); Takashi Yonemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 242 days.

(21) Appl. No.: 14/837,574

(22) Filed: Aug. 27, 2015

(65) Prior Publication Data

US 2016/0077259 A1     Mar. 17, 2016

(30) Foreign Application Priority Data

Sep. 16, 2014   (JP) ................. 2014-187674

(51) Int. Cl.
*G02B 5/26*         (2006.01)
*F21V 9/04*         (2006.01)
(Continued)

(52) U.S. Cl.
CPC ............. *G02B 5/26* (2013.01); *G02B 5/223* (2013.01); *B82Y 20/00* (2013.01)

(58) Field of Classification Search
CPC .......... G02B 5/26; G02B 5/223; B82Y 20/00
See application file for complete search history.

(56) References Cited

U.S. PATENT DOCUMENTS

2007/0194694 A1*  8/2007  Reddy ............... B82Y 20/00
                                                    313/503
2007/0228927 A1*  10/2007  Kindler ............. G03B 21/56
                                                    313/495
(Continued)

FOREIGN PATENT DOCUMENTS

JP      2012-220668 A     11/2012
JP      2013-186240 A     9/2013
JP      2014-167645 A     9/2014

OTHER PUBLICATIONS

Notification of Reasons for Refusal issued by the Japanese Patent Office dated Sep. 27, 2016, in connection with Japanese Patent Application No. 2014-187674.
(Continued)

*Primary Examiner* — Elmito Breval
(74) *Attorney, Agent, or Firm* — Edwards Neils LLC; Jean C. Edwards, Esq.

(57) ABSTRACT

The light emitting screen of the present invention includes: a blue light emitting layer emitting blue light by being excited with first excitation light; a green light emitting layer which is disposed on the blue light emitting layer and emits green light by being excited with second excitation light; a red light emitting layer which is disposed on the green light emitting layer and emits red light by being excited with third excitation light; a first selective reflection layer which is disposed between the blue light emitting layer and the green light emitting layer; and a second selective reflection layer which is disposed between the green light emitting layer and the red light emitting layer, wherein the blue light emitting layer, the green light emitting layer, and the red light emitting layer contain quantum rods or quantum dots.

16 Claims, 7 Drawing Sheets

(51) Int. Cl.
*G02B 5/22* (2006.01)
*B82Y 20/00* (2011.01)

(56) References Cited

U.S. PATENT DOCUMENTS

| | | | | |
|---|---|---|---|---|
| 2010/0019261 A1* | 1/2010 | Scianna | ................ | B82Y 20/00 257/98 |
| 2012/0315714 A1* | 12/2012 | Shanks | .............. | C09K 19/2028 438/29 |
| 2013/0335671 A1* | 12/2013 | Fleck | .................. | G02B 27/017 349/62 |

OTHER PUBLICATIONS

Ted Sun et al., Full color, high contrast front projection on black emissive display, Emerging Digital Micromirror Device Based Systems and Applications IV, Feb. 9, 2012, 82540K, Proc. SPIE 8254, San Francisco, USA.

\* cited by examiner

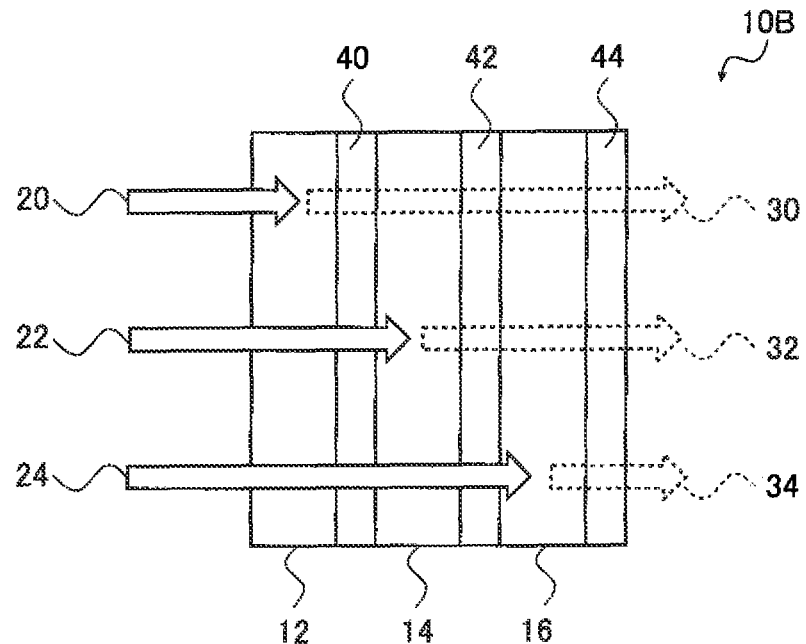
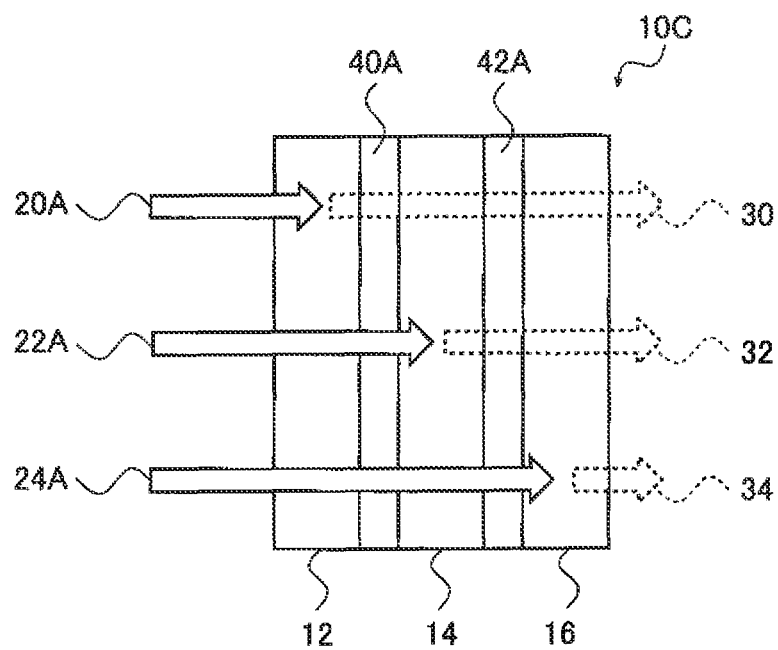

LIGHT EMITTING SCREEN AND DISPLAY APPARATUS

CROSS-REFERENCE TO RELATED APPLICATIONS

The present application claims priority under 35 U.S.C. 119 to Japanese Patent Application No. 2014-187674, filed on Sep. 16, 2014. The above application is hereby expressly incorporated by reference, in its entirety, into the present application.

BACKGROUND OF THE INVENTION

The present invention relates to a light emitting screen and a display apparatus.

In recent years, an apparatus, which uses a light emitting screen having light emitting layers that emit light by excitation light, has drawn attention as a display apparatus.

For example, Proc. SPIE 8254, 82540K (2012) (hereinafter, referred to as Non-Patent Document 1) discloses an embodiment in which a light emitting screen obtained by laminating a blue light emitting layer that emits blue light, a green light emitting layer that emits green light, and a red light emitting layer that emits red light on each other in this order is used. More specifically, as shown in FIG. 8, a light emitting screen 100 described in Non-Patent Document 1 has a blue light emitting layer 12, a green light emitting layer 14, and a red light emitting layer 16. The light emitting screen 100 is irradiated with various excitation light from the side of the blue light emitting layer 12. First, first excitation light 20 causing the blue light emitting layer 12 to emit light is radiated to a predetermined region of the blue light emitting layer 12, and as a result, blue light 30 is emitted from the region irradiated with the light. Furthermore, at the same time, second excitation light 22 causing the green light emitting layer 14 to emit light is radiated to a predetermined region of the green light emitting layer 14, and as a result, green light 32 is emitted from the region irradiated with the light. In addition, at the same time, third excitation light 24 causing the red light emitting layer 16 to emit light is radiated to a predetermined region of the red light emitting layer 16, and as a result, red light 34 is emitted from the region irradiated with the light. When an observer observes the aforementioned light emitting screen, the lights emitted from the respective layers are superimposed on each other to form a single image, and as a result, a full color image is observed.

SUMMARY OF THE INVENTION

Meanwhile, in recent years, it has been required for the light emitting screen to demonstrate further improved performance, and particularly, further improvement of the color reproducibility and brightness has been required.

The inventors of the present invention conducted examination regarding the color reproducibility and brightness of the light emitting screen described in Non-Patent Document 1. As a result, it was found that the performance of the light emitting screen does not necessarily satisfy the level required these days and needs to be further improved.

The present invention has been made in consideration of the aforementioned current circumstances, and an object thereof is to provide a light emitting screen having excellent color reproducibility and brightness.

Furthermore, another object of the present invention is to provide a display apparatus having the light emitting screen.

In order to solve the problems in the prior art, the inventors conducted intensive examination. As a result, they found that if selective reflection layers that reflect light having a predetermined wavelength are disposed in predetermined positions, the aforementioned objects can be achieved.

That is, they found that the aforementioned objects can be achieved by the following constitution.

(1) A light emitting screen comprising:

a blue light emitting layer which emits blue light by being excited with first excitation light;

a green light emitting layer which is disposed on the blue light emitting layer and emits green light by being excited with second excitation light having a wavelength longer than a wavelength of an absorption edge on a long-wavelength side of an absorption spectrum of the blue light emitting layer;

a red light emitting layer which is disposed on the green light emitting layer and emits red light by being excited with third excitation light having a wavelength longer than a wavelength of an absorption edge on a long-wavelength side of an absorption spectrum of the green light emitting layer;

a first selective reflection layer which is disposed between the blue light emitting layer and the green light emitting layer and reflects the first excitation light; and a second selective reflection layer which is disposed between the green light emitting layer and the red light emitting layer and reflects the second excitation light, wherein the blue light emitting layer, the green light emitting layer, and the red light emitting layer contain quantum rods or quantum dots.

(2) The light emitting screen according to (1), further comprising a third selective reflection layer which is disposed on the side of the red light emitting layer that is opposite to the green light emitting layer and reflects the third excitation light.

(3) The light emitting screen according to (1) or (2), wherein the blue light emitting layer, the green light emitting layer, and the red light emitting layer contain quantum rods.

(4) The light emitting screen according to any one of (1) to (3), wherein each of the first selective reflection layer and the second selective reflection layer is one selected from the group consisting of a dielectric multilayer film, a reflection-type polarizer, and a layer in which a cholesteric liquid crystal phase is fixed.

(5) A display apparatus comprising:

the light emitting screen according to any one of (1) to (4); and a light source apparatus which emits the first excitation light, the second excitation light, and the third excitation light.

(6) The display apparatus according to (5), wherein the light source apparatus has a first light source emitting the first excitation light, a second light source emitting the second excitation light, and a third light source emitting the third excitation light.

(7) The display apparatus according to (5) or (6), wherein each of the first excitation light, the second excitation light, and the third excitation light is linearly polarized light, and the first selective reflection layer and the second selective reflection layer are reflection-type polarizers.

(8) The display apparatus according to (5) or (6), wherein each of the first excitation light, the second excitation light, and the third excitation light is circularly polarized light, and the first selective reflection layer and the second selective reflection layer are layers in which a cholesteric liquid crystal phase is fixed.

According to the present invention, it is possible to provide a light emitting screen having excellent color reproducibility and brightness.

Furthermore, according to the present invention, it is also possible to provide a display apparatus having the aforementioned light emitting screen.

BRIEF DESCRIPTION OF THE DRAWINGS

FIG. 5 is a cross-sectional view of a third embodiment of the light emitting screen of the present invention.

FIG. 6 is a cross-sectional view of a fourth embodiment of the light emitting screen of the present invention.

DETAILED DESCRIPTION OF THE INVENTION

Hereinafter, the light emitting screen of the present invention will be specifically described. In the present specification, a range of numerical values described using "to" means a range that includes numerical values listed before and after "to" as a lower limit and an upper limit.

One of the characteristics of the light emitting screen of the present invention is that selective reflection layers reflecting light having a predetermined wavelength are disposed in predetermined positions. Hereinafter, first, the problems in the prior art will be specifically described.

Figure 9:
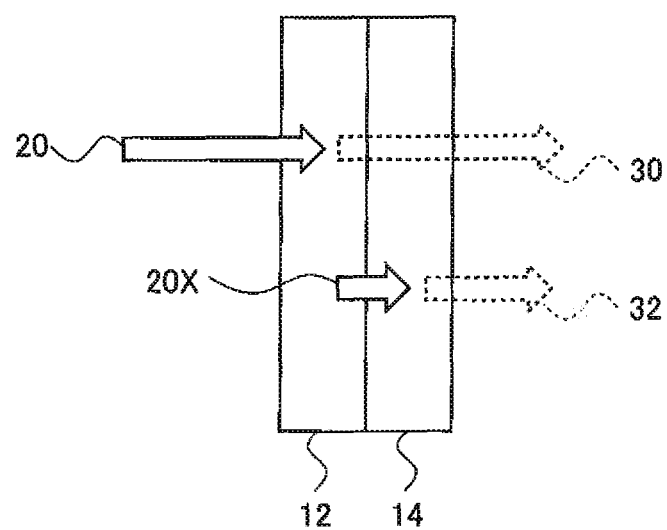
FIG. 9 is a cross-sectional view for illustrating problems of the light emitting screen in the prior art.

The present inventors conducted examination regarding the problems in the prior art. As a result, they obtained knowledge that the excitation light radiated to the light emitting screen is transmitted through a predetermined light emitting layer and induces another adjacent light emitting layer to emit light, and therefore the color reproducibility deteriorates. Hereinafter, first excitation light exciting a blue light emitting layer will be described for example. As shown in FIG. 9, the first excitation light 20 for causing the blue light emitting layer 12 to emit light is radiated. As described above, due to the first excitation light 20, the blue light 30 is emitted. Meanwhile, light 20X as a portion of the first excitation light 20 is transmitted through the blue light emitting layer 12 without being absorbed by the blue light emitting layer 12 and reaches the green light emitting layer 14 disposed in a position adjacent to the blue light emitting layer 12. The light 20X is absorbed into the green light emitting layer 14, and therefore the green light 32 is emitted. In this way, in a region which is supposed to emit only the blue light 30, a portion of the first excitation light 20 reaches the green light emitting layer 14, and the green light 32 is emitted. As a result, the color reproducibility deteriorates. The second excitation light also causes such a phenomenon.

Figure 1:
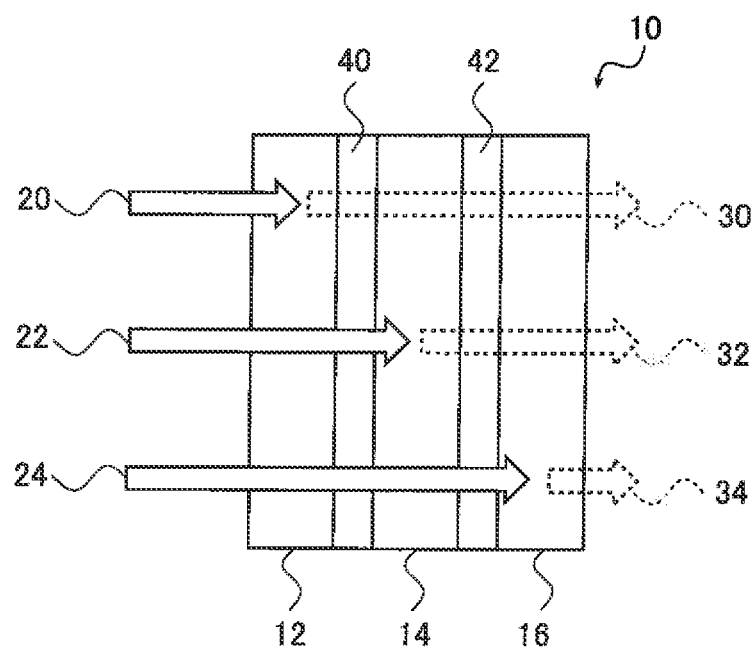
FIG. 1 is a cross-sectional view of a first embodiment of a light emitting screen of the present invention.

Based on the aforementioned knowledge, the inventors disposed a predetermined selective reflection layer between the blue light emitting layer and the green light emitting layer and between the green light emitting layer and the red light emitting layer. For example, as shown in FIG. 1 which will be described later, if a first selective reflection layer 40 reflecting the first excitation light 20 is disposed between the blue light emitting layer 12 and the green light emitting layer 14, the first excitation light 20 having been transmitted through the blue light emitting layer 12 is reflected by the first selective reflection layer 40, and therefore the first excitation light 20 is inhibited from reaching the green light emitting layer 14. As a result, the aforementioned problem can be inhibited.

When being transmitted again through the blue light emitting layer 12, the first excitation light 20 having been reflected by the first selective reflection layer 40 is absorbed into the blue light emitting layer 12, and therefore blue light is further emitted. That is, if the first selective reflection layer 40 is provided, the light emission efficiency is further improved, and consequently the brightness is improved.

First Embodiment

Hereinafter, a first embodiment of the light emitting screen of the present invention will be described with reference to drawings. FIG. 1 is a cross-sectional view of the first embodiment of the light emitting screen of the present invention. Herein, because the drawing in the present invention is a schematic view, a relationship of thickness between the respective layers or a positional relationship between the respective layers does not necessarily agree with the real one. The same will be applied to the following drawings.

A light emitting screen 10 includes the blue light emitting layer 12, the first selective reflection layer 40, the green light emitting layer 14, a second selective reflection layer 42, and the red light emitting layer 16 in this order. As shown in FIG. 1, the light emitting screen 10 is irradiated with the light emitted from a light source not shown in the drawing, from the side of the blue light emitting layer 12.

As described above, by disposing the first selective reflection layer 40 reflecting the first excitation light 20 between the blue light emitting layer 12 and the green light emitting layer 14, the first excitation light 20 is inhibited from reaching the green light emitting layer 14. The first excitation light 20 having been reflected by the first selective reflection layer 40 is absorbed into the blue light emitting layer 12 when passing again through the blue light emitting layer 12. As a result, blue light is further emitted, and the light emission efficiency is improved.

By disposing the second selective reflection layer 42 reflecting second excitation light 22 between the green light emitting layer 14 and the red light emitting layer 16, the second excitation light 22 is inhibited from reaching the red light emitting layer 16. Consequently, it is possible to inhibit the second excitation light 22 from causing the red light emitting layer 16 to emit light. The second excitation light 22 having been reflected by the second selective reflection layer 42 is absorbed into the green light emitting layer 14 when passing again through the green light emitting layer 14. As a result, green light is further emitted, and the light emission efficiency is improved.

Hereinafter, first, by using FIG. 2, a positional relationship between absorption and emission spectra of each of the light emitting layers and the wavelength of the excitation light that is established in the light emitting screen 10 will be specifically described, and then the constitution of each of the layers will be specifically described.

Figure 2:
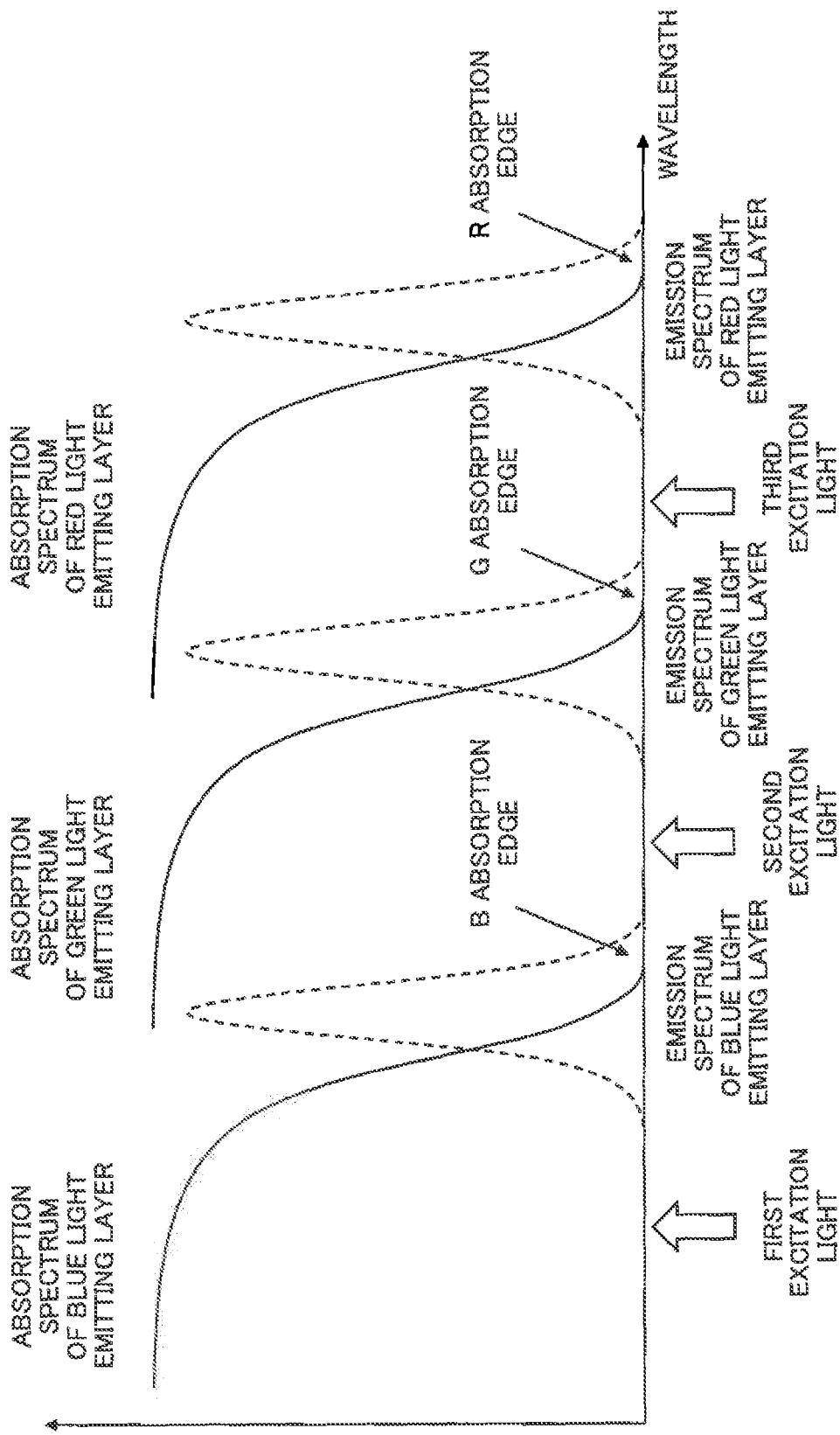
FIG. 2 is a diagram showing a positional relationship between absorption and emission spectra of each of light emitting layers in the first embodiment of the light emitting screen of the present invention and the wavelength of each of excitation light.

FIG. 2 shows a positional relationship between an absorption spectrum (ultraviolet-visible absorption spectrum) (solid line) and an emission spectrum (dotted line) of each of the light emitting layers and the wavelength of the excitation light that is established in the light emitting screen 10 shown in FIG. 1. As shown in FIG. 2, the wavelength of the absorption edge on a long-wavelength side of the absorption spectrum that will be described later is a wavelength at which the absorption starts to increase from a base line.

As shown in FIG. 2, as the first excitation light, the light that the blue light emitting layer absorbs, in other words, the light having a wavelength shorter than the wavelength of the absorption edge (B absorption edge) on the long-wavelength side of the absorption spectrum of the blue light emitting layer is used. When being irradiated with the first excitation light described above, the blue light emitting layer emits blue light.

As the second excitation light, the light having a wavelength longer than the wavelength of the absorption edge (B absorption edge) on the long-wavelength side of the absorption spectrum of the blue light emitting layer is used. If the second excitation light described above is used, the second excitation light is absorbed by the green light emitting layer while not being absorbed by the blue light emitting layer, and green light showing a predetermined emission spectrum is emitted. Herein, in order to excite the green light emitting layer, as the second excitation light, the light having a wavelength shorter than the wavelength of the absorption edge (G absorption edge) on the long-wavelength side of the absorption spectrum of the green light emitting layer is used.

As the third excitation light, the light having a wavelength longer than the wavelength of the absorption edge (G absorption edge) on the long-wavelength side of the absorption spectrum of the green light emitting layer is used. If the third excitation light described above is used, the third excitation light is absorbed by the red light emitting layer while not being absorbed by the green light emitting layer (and the blue light emitting layer), and red light showing a predetermined emission spectrum is emitted. Herein, in order to excite the red light emitting layer, as the third excitation light, the light having a wavelength shorter than the wavelength of the absorption edge (R absorption edge) on the long-wavelength side of the absorption spectrum of the red light emitting layer is used.

As the first excitation light, the second excitation light, and the third excitation light, nonpolarized light is used.

As predetermined imagewise light, each of the excitation light is radiated to each of the light emitting layers. As a result, the lights emitted from each of the light emitting layers are superimposed on each other, and a predetermined full color image is formed.

Hereinafter, each of the members constituting the light emitting screen will be specifically described.

(Blue Light Emitting Layer)

The blue light emitting layer 12 is a light emitting layer which emits the blue light 30 by being excited with the first excitation light 20. The blue light emitting layer 12 contains quantum dots. The quantum dots emit blue light by being excited with the first excitation light. In the present specification, the quantum dots emitting blue light mean quantum dots having a central emission wavelength in a wavelength band of 400 nm to 500 nm. Furthermore, in the present specification, the central emission wavelength is a wavelength (a wavelength of peak emission or maximum emission) at which the intensity of the emission spectrum is maximized.

The quantum dots refer to particles which are constituted with crystals composed of a semiconductor material, bring about a quantum confinement effect, and have a predetermined size (about several nanometers to tens of nanometers). The quantum dots emit fluorescent light by being excited with the excitation light that enters the quantum dots.

As described above, the average particle size of the quantum dots is about several nanometers to tens of nanometers. However, the size of the quantum dots is set to be an average particle size corresponding to an intended emission color. For example, in order to obtain blue light, it is preferable to set the average particle size of the quantum dots to be within a range of 1.0 nm to 3.0 nm.

The average particle size of the quantum dots is measured by a method in which the particle sizes (diameters) of ten random quantum dots are measured by observation with transmission electron microscopy (TEM), and the arithmetic mean thereof is calculated. When the shape of the quantum dots is not a perfect circle, the major axis thereof is taken as the particle size.

The aspect ratio (major axis/minor axis) of the quantum dots is not particularly limited. However, the aspect ratio is preferably within a range of 1.0 to 2.0, and more preferably within a range of 1.0 to 1.7.

The aspect ratio of the quantum dots is obtained by measuring major axes and minor axes of at least ten or more quantum dots by means of transmission electron microscopy (TEM), determining aspect ratios thereof, and calculating the arithmetic mean thereof.

The major axis of the quantum dots is the longest line among the lines crossing the quantum dots in a two-dimensional image of the quantum dots obtained by observation with microscopy (for example, transmission electron microscopy). The minor axis is the longest line among the lines that are orthogonal to the major axis and cross the quantum dots.

The material constituting the quantum dots is not particularly limited as long as the quantum dots emit blue light. Generally, the material is constituted with a semiconductor, and examples of the semiconductor include a II-VI semiconductor, a III-V semiconductor, a IV-VI semiconductor, and a combination of these. More specifically, the material can be selected from CdS, CdSe, CdTe, ZnS, ZnSe, ZnSeS, ZnTe, ZnO, GaAs, GaP, GaAs, GaSb, HgS, HgSe, HgTe, InAs, InP, InSb, AlAs, AlP, AlSb, CuS, $Cu_2S$, $Cu_2Se$, CuInS, $CuInS_2$, $CuInSe_2$, $Cu_2(ZnSn)S_4$, $Cu_2(InGa)S_4$, a $TiO_2$ alloy of these, and a mixture of these.

The quantum dots are preferably CdS, CdSe, ZnS, ZnSe, InP, CuS, and CuInS.

The quantum dots may be quantum dots composed of a single component or core/shell-type quantum dots having a core composed of a first semiconductor and a shell composed of a second semiconductor. Furthermore, the quantum dots may be core/multishell-type quantum dots, and quantum dots having a core/shell structure in which the shell has a stepwise composition can also be used.

The amount of the quantum dots contained in the blue light emitting layer 12 is not particularly limited. However, in view of better light emission characteristics, the amount of the quantum dots is preferably 0.01% by mass to 3% by mass, and more preferably 0.05% by mass to 1% by mass with respect to the total mass of the blue light emitting layer 12.

As described above, if the first selective reflection layer 40 is disposed in the present invention, the first excitation light 20 having been reflected by the first selective reflection layer 40 passes through the blue light emitting layer 12, and therefore there is a chance for the blue light emitting layer 12 to absorb again the first excitation light 20. Accordingly, a certain level of brightness can be obtained by using quantum dots in a smaller amount compared to the prior art. As a result, the transparency of the light emitting screen itself is further improved, and bright point defect does not easily occur.

The blue light emitting layer 12 may contain components other than the quantum dots, and preferably contains a polymer as a binder.

The type of the polymer is not particularly limited, and known polymers can be used. Examples of the polymer include a polyolefin-based resin such as polyethylene or polypropylene, a polyester-based resin such as polyethylene terephthalate or polyethylene naphthalate, a polyacryl-based resin such as polymethyl methacrylate, a polyurethane-based resin, a polycarbonate-based resin, a polyether-based resin, an epoxy-based resin, a silicone-based resin, and the like.

The thickness of the blue light emitting layer 12 is not particularly limited. However, in view of better light emission characteristics and color reproducibility, the thickness of the blue light emitting layer 12 is preferably 5 µm to 300 µm, and more preferably 30 µm to 200 µm.

The aforementioned thickness is an average thickness which is a value obtained by measuring thicknesses of the blue light emitting layer 12 in ten random points and calculating the arithmetic mean thereof.

The manufacturing method of the blue light emitting layer 12 is not particularly limited, and known methods can be used. For example, it is possible to use a method in which a predetermined substrate is coated with a composition for forming a blue light emitting layer containing quantum dots and a polymer and then subjected to drying processing if necessary, or a method in which a predetermined substrate is coated with a curable composition containing quantum dots and a polymerizable monomer so as to form a coating film, and the coating film is subjected to curing processing (light irradiation processing and/or heating processing).

Examples of the coating method include known coating methods such as a curtain coating method, a dip coating method, a spin coating method, a printing coating method, a spray coating method, a slot coating method, a roll coating method, a slide coating method, a blade coating method, a gravure coating method, and a wire bar method.

In view of reactivity, a radically polymerizable compound is preferable as the aforementioned polymerizable monomer used in the curable composition. Particularly, from the viewpoints of transparency, adhesiveness, and the like of the cured film formed after curing, a (meth)acrylate compound such as a monofunctional or polyfunctional (meth)acrylate monomer, a polymer or prepolymer thereof, and the like are preferable. In the present specification, the term "(meth) acrylate" is used to mean either or both of acrylate and methacrylate. The usage of the term "(meth)acryloyl" or the like is also the same.

The curable composition may further contain a polymerization initiator (for example, a radical initiator). Regarding the polymerization initiator, for example, paragraph [0037] of JP 2013-043382 A can be referred to. The amount of the polymerization initiator is preferably equal to or greater than 0.1 mol % and more preferably 0.5 mol % to 2 mol % with respect to the total mass of the polymerizable monomer contained in the curable composition.

The curable composition may further contain other components (for example, a solvent).

(Green Light Emitting Layer)

The green light emitting layer 14 is a light emitting layer which emits the green light 32 by being excited with the second excitation light 22. The green light emitting layer 14 contains quantum dots, and the quantum dots emit green light by being excited with the second excitation light. In the present specification, the quantum dots emitting green light mean quantum dots having a central emission wavelength in a wavelength band of longer than 500 nm and equal to or shorter than 600 nm.

The quantum dots used may be quantum dots emitting green light, and the material constituting the quantum dots is appropriately selected from the materials described in the aforementioned section of (Blue light emitting layer).

As described above, the average particle size of the quantum dots used is about several nanometers to tens of nanometers. However, the particle size of the quantum dots is set to be an average particle size corresponding to an intended emission color. For example, in order to obtain green light, the average particle size of the quantum dots is preferably set to be within a range of 1.5 nm to 10 nm.

For example, the aspect ratio of the quantum dots used is within the range of the aspect ratio described in the aforementioned section of (Blue light emitting layer).

The green light emitting layer 14 may contain materials other than the quantum dots, and preferably contains a polymer as a binder. As the type of the polymer, the polymers described in the aforementioned section of (Blue light emitting layer) are exemplified.

As the manufacturing method of the green light emitting layer 14, for example, the aforementioned manufacturing method of the blue light emitting layer 12 can be used.

The thickness of the green light emitting layer 14 is not particularly limited. However, in view of better light emission characteristics and color reproducibility, the thickness of the green light emitting layer 14 is within the aforementioned range of the thickness of the blue light emitting layer 12, for example.

(Red Light Emitting Layer)

The red light emitting layer 16 is a light emitting layer which emits the red light 34 by being excited with third excitation light 24. The red light emitting layer 16 contains quantum dots, and the quantum dots emit red light by being excited with the third excitation light. In the present specification, the quantum dots emitting red light mean quantum dots having a central emission wavelength in a wavelength band of longer than 600 nm and equal to or shorter than 680 nm.

The quantum dots used may be quantum dots emitting red light, and the material constituting the quantum dots is appropriately selected from the materials described in the aforementioned section of (Blue light emitting layer).

As described above, the average particle size of the quantum dots used is about several nanometers to tens of nanometers. However, the particle size of the quantum dots is set to be an average particle size corresponding to an intended emission color. For example, in order to obtain red light, the average particle size of the quantum dots is preferably set to be within a range of 3.0 nm to 20 nm.

For example, the aspect ratio of the quantum dots used is within the range of the aspect ratio described in the aforementioned section of (Blue light emitting layer).

The red light emitting layer 16 may contain materials other than the quantum dots, and preferably contains a polymer as a binder. As the type of the polymer, the polymers described in the aforementioned section of (Blue light emitting layer) are exemplified.

As the manufacturing method of the red light emitting layer 16, for example, the aforementioned manufacturing method of the blue light emitting layer 12 can be used.

The thickness of the red light emitting layer 16 is not particularly limited. However, in view of better light emission characteristics and color reproducibility, the thickness of the red light emitting layer 16 is within the aforementioned range of the thickness of the blue light emitting layer 12, for example.

(First Selective Reflection Layer)

The first selective reflection layer 40 is a layer which is disposed between the blue light emitting layer 12 and the green light emitting layer 14 and reflects the first excitation light 20 that enters from the side of the blue light emitting layer 12 (the first selective reflection layer 40 is a layer having a wavelength-selective reflection function).

The first selective reflection layer 40 may be a layer reflecting the first excitation light 20. In other words, it is preferable that the first selective reflection layer 40 is a layer that reflects the light having a short wavelength equal to or shorter than the wavelength of the absorption edge (B absorption edge) on the long-wavelength side of the absorption spectrum of the blue light emitting layer 12. Furthermore, it is preferable that the first selective reflection layer 40 is a layer that reflects the light having a wavelength shorter than the peak wavelength of the blue light emitted from the blue light emitting layer 12.

The first selective reflection layer 40 is constituted with a dielectric multilayer film. The dielectric multilayer film is a film in which a large number of films composed of a dielectric material with a low reflective index and a large number of films composed of a dielectric material with a high refractive index are alternatively layered on each other at a predetermined optical film thickness. By controlling the refractive index and the optical film thickness of the materials used, the first selective reflection layer 40 can reflect the light having a specific wavelength. In the first selective reflection layer 40, the refractive index and the optical film thickness of the respective films are appropriately designed such that the first selective reflection layer 40 can reflect the first excitation light 20.

The materials constituting the dielectric multilayer film are not particularly limited, and may be organic materials or inorganic materials.

As the organic materials, for example, known polymers can be used. More specifically, examples thereof include polyolefins, polystyrenes, polycarbonates, poly(meth)acryls, polycarbodiimides, polyarylates, silicone resins, polyimides, and the like.

The method for preparing the dielectric multilayer film by using the aforementioned polymers is not particularly limited, and various known methods can be adopted. For example, as described in JP 3971455 B and JP 5365839 B, the dielectric multilayer film can be prepared by biaxially stretching a predetermined multilayer film.

As the inorganic materials, known inorganic materials can be used. Examples thereof include $TiO_2$ (titanium dioxide), $Ta_2O_5$ (tantalum pentoxide), $ZrO_2$ (zirconium oxide), $Al_2O_3$ (aluminum oxide), $Nb_2O_5$ (niobium pentoxide), $SiO_2$ (silicon oxide), $MgF_2$ (magnesium fluoride), $ZnO_2$ (zinc oxide), $HfO_2$ (hafnium oxide), $CaF_2$ (calcium fluoride), and SiN (silicon nitride).

The method for preparing the dielectric multilayer film by using the aforementioned inorganic materials is not particularly limited, and various known methods can be adopted. Examples of the methods include a method of preparing the film by a physical vapor deposition (PVD) method such as a vacuum deposition method, a sputtering method, an ion plating method, an ion beam method, an ion-assisted method, or a laser ablation method or by a chemical vapor deposition (CVD) method such as a thermal CVD method, an optical CVD method, or a plasma CVD method.

The number of the films composed of a dielectric material with a low refractive index to be laminated and the number of films composed of a dielectric material with a high refractive index to be laminated are not particularly limited. However, the number of the films is generally 10 to 80, and preferably 10 to 30, respectively.

The thickness of the first selective reflection layer 40 is not particularly limited. However, in order to obtain reflection characteristics and to obtain a thin first selective reflection layer 40 in a well-balanced manner, the thickness of the first selective reflection layer 40 is preferably 3 μm to 100 μm, and more preferably 5 μm to 50 μm.

In the present embodiment, an embodiment is described in which the dielectric multilayer film is used as the first selective reflection layer and the second selective reflection layer which will be described later. However, the present invention is not limited to this embodiment. As will be described later, it is possible to use a reflection-type polarizer, a layer in which a cholesteric liquid crystal phase is fixed, or the like as the first selective reflection layer and the second selective reflection layer. In addition, it is also possible to use a dye-containing layer which contains a predetermined dye (for example, see paragraphs [0065] to [0075] of JP 2008-70464 A).

(Second Selective Reflection Layer)

The second selective reflection layer 42 is a layer which is disposed between the green light emitting layer 14 and the red light emitting layer 16 and reflects the second excitation light 22 that enters from the side of the green light emitting layer 14 (the second selective reflection layer 42 is a layer having a wavelength-selective reflection function).

The second selective reflection layer 42 may be a layer reflecting the second excitation light 22. In other words, it is preferable that the second selective reflection layer 42 is a layer that reflects the light having a short wavelength equal to or shorter than the wavelength of the absorption edge (G absorption edge) of the long-wavelength side of the absorption spectrum of the green light emitting layer 14. Furthermore, it is preferable that the second selective reflection layer 42 is a layer that reflects the light having a wavelength shorter than the peak wavelength of the green light emitted from the green light emitting layer 14.

The second selective reflection layer 42 is constituted with a dielectric multilayer film. The dielectric multilayer film has the same definition as the aforementioned definition of the first selective reflection layer 40. The constitution of the dielectric multilayer film is appropriately designed such that the second selective reflection layer 42 reflects the second excitation light 22.

The thickness of the second selective reflection layer 42 is not particularly limited. However, in order to obtain reflection characteristics and to obtain a thin second selective reflection layer 42 in a well-balanced manner, the thickness of the second selective reflection layer 42 is preferably 3 μm to 100 μm, and more preferably 5 μm to 50 μm.

The manufacturing method of the light emitting screen having the various layers described above is not particularly limited, and known methods can be adopted.

For example, it is possible to adopt a method of manufacturing the light emitting screen by preparing the respective layers on a temporary support and laminating the respective layers on each other by a transfer method, or a method of coating each of compositions constituting the respective layers in order. When the transfer method is adopted, a pressure-sensitive adhesive layer or an adhesive layer may be disposed between the respective layers.

The light emitting screen may include layers other than the aforementioned layers. For example, the light emitting screen may include a barrier film as the outermost layer.

The barrier film is a layer functioning as a gas barrier that blocks oxygen. It is also preferable that the barrier film functions to block water vapor.

The barrier film may be any of known barrier films, and preferably includes at least an inorganic layer. Furthermore, the barrier film may be a film including a substrate film and an inorganic layer. In addition, the barrier film may include a barrier laminate, which is composed of at least one inorganic layer and at least one organic layer, on a substrate film. If a plurality of layers is laminated on each other in this way, the barrier properties can be further improved, and therefore it is preferable from the viewpoint of improving light fastness. Specifically, it is preferable that the barrier film has a total light transmittance of equal to or greater than 80% in the visible light region and has an oxygen transmission rate of equal to or less than 1.00 $cm^3/(m^2 \cdot day \cdot atm)$. Herein, the oxygen transmission rate is a value measured under a condition of a measurement temperature of 23° C. and a relative humidity of 90% by using an oxygen gas transmission rate-measuring apparatus (manufactured by MOCON, Inc., OX-TRAN 2/20: trade name). In addition, a region of a wavelength of 380 nm to 780 nm is regarded as the visible light region, and the total light transmittance represents the average of the light transmittance over the visible light region.

The light emitting screen may include a known antireflection layer (particularly, the antireflection layer may be disposed at the position of the outermost layer of the light emitting screen).

(Display Apparatus)

As shown in FIG. 1, the light emitting screen 10 is irradiated with the predetermined first excitation light 20, second excitation light 22, and third excitation light 24 emitted from a light source apparatus not shown in the drawing, from the side of the blue light emitting layer 12. The display apparatus of the present invention includes the light emitting screen 10 and the light source apparatus not shown in the drawing.

As described above, in the present embodiment, as the first excitation light 20, the second excitation light 22, and the third excitation light 24, nonpolarized light is used. Herein, as will be described later, linearly polarized light or circularly polarized light may be used as the excitation light.

Each of the excitation lights just needs to be able to excite each of the layers corresponding thereto. However, it is preferable to use monochromatic light as each of the excitation lights because such excitation light is inhibited from being absorbed into another layer.

FIG. 1 shows an embodiment in which each of the excitation lights is radiated in the normal line direction of the blue light emitting layer 12. However, the present invention is not limited to this embodiment, and each of the excitation lights may be radiated in an oblique direction with respect to the surface of the blue light emitting layer 12 (a direction inclined by a predetermined angle from the normal line direction). In the second to fifth embodiments which will be described later, the excitation light may also be radiated in the oblique direction.

As will be described later, linearly polarized light or circularly polarized light can be used as the excitation light. In the case of the excitation light that obliquely enters the light emitting screen, in order to reduce the light reflected from the surface, the excitation light is preferably linearly polarized light in a p-polarization state.

It is known that, for the oblique light, the central reflection wavelength of the selective reflection layers (the first and second selective reflection layers) shifts to a short-wave side, and this phenomenon is called blue shift. In the case of the oblique light, a difference in optical path length between the respective layers is reduced due to optical interference, and the blue shift occurs for this reason. Accordingly, in order to avoid the blue shift as much as possible, it is desirable that the excitation light be radiated from an angle close to the front. Specifically, it is preferable that the excitation light is radiated in a direction inclined by ±20° from the normal line direction of the surface of the blue light emitting layer 12.

In the case of obliquely radiating the excitation light, it is desirable to correct in advance the decrement caused by the shift to the short-wave side such that the central reflection wavelength on the front side of the selective reflection layer shifts to the long-wave side. In a case in which the oblique light is propagated in the selective reflection layer, provided that the angle between the light and the front side of the selective reflection layer is θ, the central wavelength of the oblique light equals central wavelength on the front side×cos θ. It is possible to shift the central reflection wavelength in consideration of the central wavelength of the oblique light obtained as above.

Furthermore, it is desirable to use a selective reflection layer that causes the blue shift to a small extent. For example, the layer in which a cholesteric liquid crystal phase is fixed, which will be described later, is desirable because such a layer makes it possible to suppress the blue shift by forming concavities and convexities with a curved surface on the surface of the cholesteric layer. For forming such concavities and convexities with a curved surface, for example, it is possible to use the method described in Won-Gun Jang, et al, Applied Physics Express 1 (2008) 032001. If the concavities and convexities with a curved surface are formed on the surface of the cholesteric layer, the excitation light radiated from a wide range of angle can be reflected at a wide range of angle. Accordingly, it is desirable because fluorescent light emission efficiency is increased, and thus the brightness is improved in the constitution of the present embodiment.

The constitution of the light source apparatus used in the display apparatus of the present invention is not particularly limited as long as the light source apparatus can emit various excitation lights described above. For example, an embodiment may be adopted in which the light source apparatus has three light sources including a first light source emitting the first excitation light 20, a second light source emitting the second excitation light 22, and a third light source emitting the third excitation light 24. As the first to third light sources, it is preferable to use a so-called laser light source.

In addition to the aforementioned embodiment, an embodiment may be adopted in which the light source apparatus includes a white light source and a dichroic filter. In this embodiment, the light emitted from the white light source can be separated into three colors by the dichroic filter.

Furthermore, an embodiment may also be adopted in which the light source apparatus includes a white light source and a color wheel. Through the color wheel rotating at a high speed, red/green/blue light can be obtained in a time-sharing manner from the light emitted from the white light source.

Second Embodiment

Figure 3:
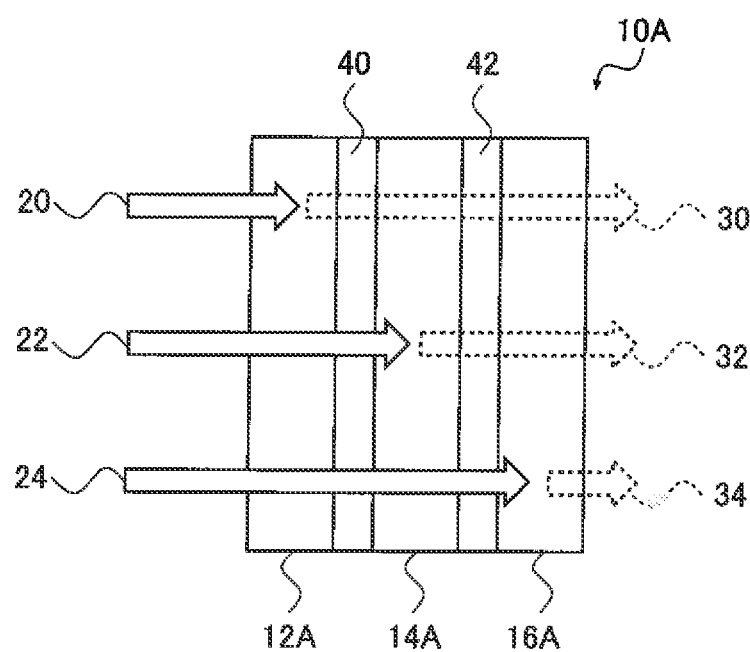
FIG. 3 is a cross-sectional view of a second embodiment of the light emitting screen of the present invention.

Hereinafter, a second embodiment of the light emitting screen of the present invention will be described with reference to drawings. FIG. 3 is a cross-sectional view of the second embodiment of the light emitting screen of the present invention.

A light emitting screen 10A includes a blue light emitting layer 12A, the first selective reflection layer 40, a green light emitting layer 14A, the second selective reflection layer 42, and a red light emitting layer 16A in this order. As shown in FIG. 3, the light emitting screen 10A is irradiated with the light emitted from a light source not shown in the drawing, from the side of the blue light emitting layer 12A. Each of the blue light emitting layer 12A, the green light emitting layer 14A, and the red light emitting layer 16A contains quantum rods.

In the blue light emitting layer 12A, the green light emitting layer 14A, and the red light emitting layer 16A of the light emitting screen 10A shown in FIG. 3, the quantum rods are used instead of quantum dots. Except for this, the light emitting screen 10A shown in FIG. 3 has the same layers as those of the light emitting screen 10 shown in FIG. 1. Accordingly, the same constituents are marked with the same reference numerals so as not to repeat the description thereof. The following description is mainly focused on the quantum rods.

As will be described later, the quantum rods are also called semiconductor nanorods and are rod-like semiconductor nanocrystals (nanoparticles). One of the characteristics of the quantum rods is that the peak position of the emission spectrum thereof is more easily positioned on the long-wavelength side compared to the peak position of the emission spectrum of the aforementioned quantum dots. Accordingly, if the quantum rods are used, the light emitted from each of the light emitting layers is not easily absorbed into the adjacent light emitting layer. Hereinafter, the present embodiment will be more specifically described by using FIG. 4.

Figure 4:
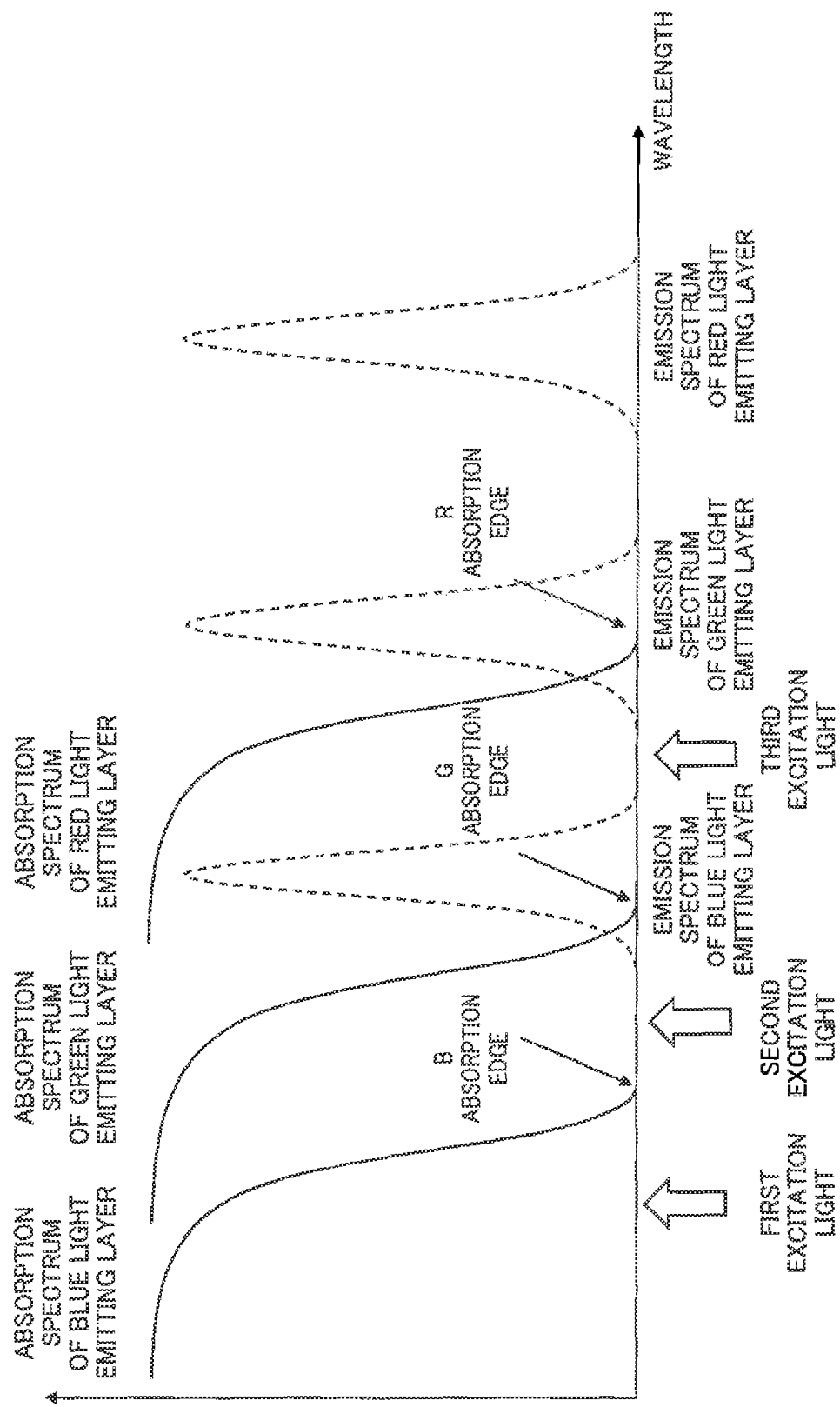
FIG. 4 is a diagram showing a positional relationship between absorption and emission spectra of each of light emitting layers in the second embodiment of the light emitting screen of the present invention and the wavelength of each of excitation light.

FIG. 4 shows a positional relationship between the absorption and emission spectra of each of the light emitting layers containing the quantum rods and the wavelength of the excitation light.

As shown in FIG. 4, first, the first to third excitation lights satisfy the same relationship as that of the embodiment shown in FIG. 2. Specifically, as the first excitation light, the light is used which has a wavelength shorter than the wavelength of the absorption edge (B absorption edge) on the long-wavelength side of the absorption spectrum of the blue light emitting layer. As the second excitation light, the light is used which has a wavelength longer than the wavelength of the absorption edge (B absorption edge) on the long-wavelength side of the absorption spectrum of the blue light emitting layer. As the third excitation light, the light is used which has a wavelength longer than the wavelength of the absorption edge (G absorption edge) on the long-wavelength side of the absorption spectrum of the green light emitting layer.

A big difference between the case of using the quantum rods and the case of using the quantum dots is the relationship between the absorption spectrum and the emission spectrum of each of the light emitting layers. For example, in FIG. 2, the position of the emission spectrum of the blue light emitting layer overlaps the position of the absorption spectrum of the green light emitting layer. That is, a portion of the blue light emitted from the blue light emitting layer is absorbed into the green light emitting layer, and thus green light is emitted from the green light emitting layer. In contrast, as shown in FIG. 4, in the case of using the quantum rods, the position of the absorption spectrum is spaced quite apart from the position of the emission spectrum. More specifically, the absorption edge (B absorption edge) on the long-wavelength side of the absorption spectrum of the blue light emitting layer is separated from the edge on the short-wavelength side of the emission spectrum of the blue light emitting layer by a predetermined wavelength. Therefore, the emission spectrum of the blue light emitting layer overlaps the absorption spectrum of the green light emitting layer to a small extent. That is, the blue light emitted from the blue light emitting layer is not absorbed into the green light emitting layer, and therefore the color reproducibility and brightness are further improved. Hitherto, the emission spectrum of the blue light emitting layer has been described, but the same effect is also obtained in the emission spectrum of other light emitting layers. More specifically, because the portion of overlap between the emission spectrum of the green light emitting layer and the absorption spectrum of the red light emitting layer is small, the green light emitted from the green light emitting layer is not absorbed into the red light emitting layer, and therefore the color reproducibility and brightness are further improved.

As described above, by using the quantum rods instead of the quantum dots, the color reproducibility and brightness of the light emitting screen are further improved.

Each of the blue light emitting layer 12A, the green light emitting layer 14A, and the red light emitting layer 16A contains the quantum rods.

As the quantum rods contained in the blue light emitting layer 12A, quantum rods that emit blue light by being excited with the first excitation light may be used. In the present specification, the quantum rods that emit blue light mean quantum rods having a central emission wavelength in a wavelength band of 400 nm to 500 nm.

As the quantum rods contained in the green light emitting layer 14A, quantum rods that emit green light by being excited with the second excitation light may be used. In the present specification, the quantum rods that emit green light mean quantum rods having a central emission wavelength in a wavelength band of longer than 500 nm and equal to or shorter than 600 nm.

As the quantum rods contained in the red light emitting layer 16A, quantum rods that emit red light by being excited with the third excitation light may be used. In the present specification, the quantum rods that emit red light mean quantum rods having a central emission wavelength in a wavelength band of longer than 600 nm and equal to or shorter than 680 nm.

As described above, the quantum rods are also called semiconductor nanorods and are rod-like semiconductor nanocrystals (nanoparticles). Because the quantum rods have a rod shape and orientation, when the light emitted from a light source enters the quantum rods, the quantum rods emit polarized light. That is, the quantum rods are materials that emit fluorescent light by being excited with the excitation light that enters the quantum rods.

The emission wavelength of the quantum rods varies with the shape and material thereof. Consequently, by controlling the shape and material, quantum rods can be adjusted so as to emit light having various wavelengths.

The length of the major axis (the length in the major axis direction) of the quantum rods contained in each of the light emitting layers is not particularly limited. However, because the position of the absorption spectrum is spaced quite apart from the position of the emission spectrum, the length of the major axis of the quantum rods is preferably 8 nm to 100 nm, more preferably 20 nm to 60 nm, and even more preferably 20 nm to 50 nm.

The length of the minor axis (the length in the minor axis direction) of the quantum rods is not particularly limited. However, because the position of the absorption spectrum is spaced quite apart from the position of the emission spectrum, the length of the minor axis of the quantum rods is preferably 2 nm to 15 nm, and more preferably 3 nm to 10 nm.

The major axis of the quantum rods refers to the longest line among the lines crossing the quantum rods in a two-dimensional image of the quantum rods obtained by observation with microscopy (for example, transmission electron microscopy). The minor axis is the longest line among the lines that are orthogonal to the major axis and cross the quantum rods.

The length of the major axis is an average value which is obtained by measuring lengths of major axes of randomly selected ten or more quantum rods by means of microscopy (for example, transmission electron microscopy) and calculating the arithmetic mean thereof.

Furthermore, the length of the minor axis is an average value which is obtained by measuring lengths of minor axes of randomly selected ten or more quantum rods by means of microscopy (for example, transmission electron microscopy) and calculating the arithmetic mean thereof.

The aspect ratio of the quantum rods (major axis of quantum rods/minor axis of quantum rods) is not particularly limited. However, because the position of the absorption spectrum is spaced quite apart from the position of the emission spectrum, the aspect ratio is preferably 3 to 20, more preferably 3 to 15, and even more preferably 4 to 12.

The aspect ratio is an average value which is obtained by measuring the aspect ratios of randomly selected ten or more quantum rods by means of microscopy (for example, transmission electron microscopy) and calculating the arithmetic mean thereof.

The quantum rods have a shape (rod shape) that extends in one direction, and the quantum rods may have a so-called cylindrical shape, quadrangular prism shape (preferably rectangular prism shape), triangular prism shape, hexagonal prism shape, or the like.

The material constituting the quantum rods is not particularly limited, and examples thereof include the aforementioned materials constituting the quantum dots.

The quantum rods may be quantum rods composed of a single component or core/shell-type quantum rods having a core composed of a first semiconductor and a shell composed of a second semiconductor. Furthermore, the quantum rods may be core/multishell-type quantum rods, and quantum rods having a core/shell structure in which the shell has a stepwise composition can also be used.

The definition of the amount of the quantum rods contained in each of the light emitting layers (the blue light emitting layer 12A, the green light emitting layer 14A, and the red light emitting layer 16A) is the same as the definition of the amount of the quantum dots contained in each of the light emitting layers that contain the aforementioned quantum dots.

Furthermore, each of the light emitting layers (the blue light emitting layer 12A, the green light emitting layer 14A, and the red light emitting layer 16A) may contain the aforementioned polymer as a binder.

As will be described later, as the first to third excitation lights, linearly polarized light can be used. In this case, it is preferable that the linearly polarized excitation light is radiated such that the polarizing direction thereof becomes parallel to the maximum absorption direction (generally, the major axis direction) of the quantum rods.

Third Embodiment

Hereinafter, a third embodiment of the light emitting screen of the present invention will be described with reference to a drawing. FIG. 5 is a cross-sectional view of the third embodiment of the light emitting screen of the present invention.

A light emitting screen 10B includes the blue light emitting layer 12, the first selective reflection layer 40, the green light emitting layer 14, the second selective reflection layer 42, the red light emitting layer 16, and a third selective reflection layer 44 in this order. As shown in FIG. 5, the light emitting screen 10B is irradiated with the light emitted from a light source not shown in the drawing, from the side of the blue light emitting layer 12.

Except for using the third selective reflection layer 44, the light emitting screen 10B shown in FIG. 5 has the same layers as those of the light emitting screen 10 shown in FIG. 1. Accordingly, the same constituents are marked with the same reference numerals so as not to repeat the description thereof. The following description is mainly focused on the third selective reflection layer 44.

(Third Selective Reflection Layer 44)

The third selective reflection layer 44 is a layer which is disposed on the side of the red light emitting layer 16 that is opposite to the green light emitting layer 14, and reflects the third excitation light 24 (the third selective reflection layer 44 is a layer having a wavelength-selective reflection function). Because the third selective reflection layer 44 is disposed as described above, the third excitation light having been transmitted through the red light emitting layer 16 is reflected. Accordingly, the third excitation light 24 is absorbed into the red light emitting layer 16 when passing again through the red light emitting layer 16, and thus red light is further emitted. Therefore, the light emission efficiency of red light is improved.

The third selective reflection layer 44 may be a layer that reflects the third excitation light 24. In other words, the third selective reflection layer 44 is preferably a layer which reflects the light having a short wavelength equal to or shorter than the wavelength of the absorption edge (R absorption edge) on the long-wavelength side of the absorption spectrum of the red light emitting layer 16. Furthermore, the third selective reflection layer 44 is preferably a layer which reflects the light having a wavelength shorter than the peak wavelength of the green light emitted from the green light emitting layer 14.

The third selective reflection layer 44 is constituted with a dielectric multilayer film. The definition of the dielectric multilayer film is the same as the definition described above for the first selective reflection layer 40. The constitution of the dielectric multilayer film is appropriately designed such that the third excitation light 24 is reflected.

The thickness of the third selective reflection layer 44 is not particularly limited. However, in order to obtain reflection characteristics and to obtain a thin third selective reflection layer 44 in a well-balanced manner, the thickness of the third selective reflection layer 44 is preferably 3 µm to 100 µm, and more preferably 5 µm to 50 µm.

Fourth Embodiment

Hereinafter, a fourth embodiment of the light emitting screen of the present invention will be described with reference to a drawing. FIG. 6 is a cross-sectional view of the fourth embodiment of the light emitting screen of the present invention.

A light emitting screen 10C includes the blue light emitting layer 12, a first selective reflection layer 40A, the green light emitting layer 14, a second selective reflection layer 42A, and the red light emitting layer 16 in this order. The first selective reflection layer 40A and the second selective reflection layer 42A are reflection-type polarizers. As shown in FIG. 6, the light emitting screen 10C is irradiated with the light emitted from a light source not shown in the drawing, from the side of the blue light emitting layer 12. Each of first excitation light 20A, second excitation light 22A, and third excitation light 24A radiated to the light emitting screen 10C is linearly polarized light.

Except for using the first selective reflection layer 40A and the second selective reflection layer 42A, the light emitting screen 10C shown in FIG. 6 has the same layers as those of the light emitting screen 10 shown in FIG. 1. Accordingly, the same constituents are marked with the same reference numerals so as not to repeat the description thereof. The following description is mainly focused on the first selective reflection layer 40A and the second selective reflection layer 42A.

(First Selective Reflection Layer 40A and Second Selective Reflection Layer 42A)

Each of the first selective reflection layer 40A and the second selective reflection layer 42A is constituted with a reflection-type polarizer.

Generally, the reflection-type polarizer is a polarizer which can selectively transmit the light in a vibration direction parallel to a single in-plane axis (transmission axis) while reflecting other light.

The type of the reflection-type polarizer is not particularly limited, and examples thereof include a linear polarizer obtained by laminating birefringent resins on each other, a circular polarizer obtained by combining cholesteric liquid crystals with a λ/4 plate, a wire grid-type polarizer, and the like. More specifically, examples of the reflection-type polarizer include DBEF manufactured by 3M (for example, see JP 4-268505 A), PCF manufactured by NITTO DENKO CORPORATION (for example, see JP 11-231130 A), and the like.

In the present specification, the polarizer, which selectively transmits the light in a vibration direction parallel to a single in-plane axis (transmission axis) as described above, is regarded as a "reflection-type polarizer" and regarded as not being included in the aforementioned "dielectric multilayer film".

The light emitting screen 10C, which includes the first selective reflection layer 40A and the second selective reflection layer 42A constituted with the reflection-type polarizer, is irradiated with excitation light composed of linearly polarized light.

More specifically, the first excitation light 20A is radiated to the blue light emitting layer 12, such that the direction of the transmission axis of the reflection-type polarizer constituting the first selective reflection layer 40A becomes orthogonal to the polarizing direction of the first excitation light 20A which is the linearly polarized light. Most of the first excitation light 20A is absorbed into the blue light emitting layer 12, and blue light is emitted from the blue light emitting layer 12. In contrast, the first excitation light 20A having not been absorbed into the blue light emitting layer 12 is reflected by the first selective reflection layer 40A which is the reflection-type polarizer. Because the linearly polarized light is extremely efficiently reflected by the reflection-type polarizer, the color reproducibility and brightness are further improved.

In the same way as the first excitation light 20A, the second excitation light 22A is radiated to the green light emitting layer 14, such that the polarizing direction of the second excitation light 22A becomes orthogonal to the direction of the transmission axis of the reflection-type polarizer constituting the second selective reflection layer 42A. The second excitation light 22A having not been absorbed into the green light emitting layer 14 is efficiently reflected by the second selective reflection layer 42A which is the reflection-type polarizer.

In the above embodiment, the amount of the emitted light, which is reflected by each of the selective reflection layers after being emitted from each of the light emitting layers, halves, and therefore the deterioration of brightness is further inhibited. More specifically, for example, when the emission spectrum of the blue light 30 emitted from the blue light emitting layer 12 and the reflection region of the first selective reflection layer 40A partially overlap with each other, the blue light 30 in the overlapping reflection region is reflected. However, because the first selective reflection layer 40A reflects only a predetermined linearly polarized light, the blue light 30 parallel to the transmission axis of the first selective reflection layer 40A is transmitted, and as a result, the deterioration of brightness is further inhibited.

The method for radiating the linearly polarized excitation light as described above is not particularly limited, and examples thereof include a method of disposing a polarizer between the light emitting screen and the light source apparatus.

In the fourth embodiment, the aforementioned third selective reflection layer may be further disposed in the light emitting screen. In this case, the third selective reflection layer is preferably constituted with a reflection-type polarizer just like the first selective reflection layer 40A and the second selective reflection layer 42A.

Fifth Embodiment

Figure 7:
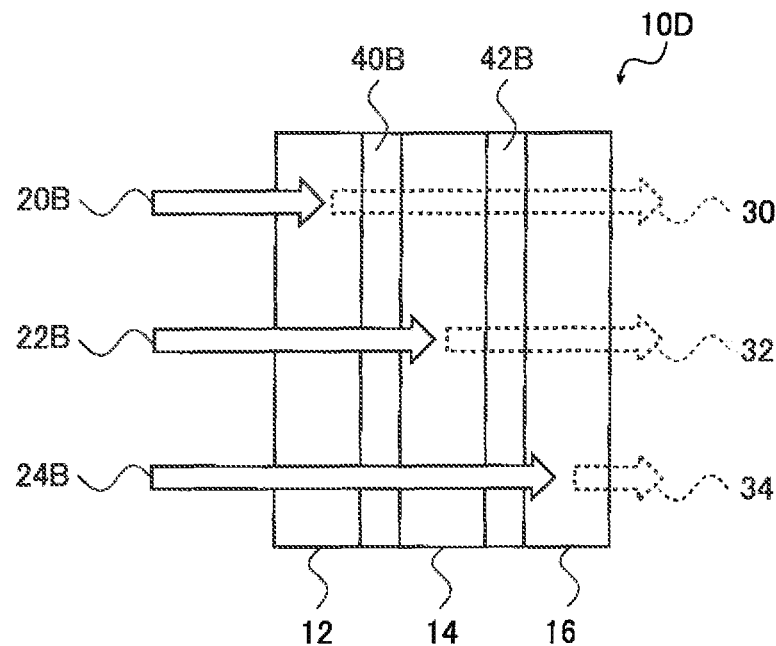
FIG. 7 is a cross-sectional view of a fifth embodiment of the light emitting screen of the present invention.

Hereinafter, a fifth embodiment of the light emitting screen of the present invention will be described with reference to a drawing. FIG. 7 is a cross-sectional view of the fifth embodiment of the light emitting screen of the present invention.

A light emitting screen 10D includes the blue light emitting layer 12, a first selective reflection layer 40B, the green light emitting layer 14, a second selective reflection layer 42B, and the red light emitting layer 16 in this order. The first selective reflection layer 40B and the second selective reflection layer 42B are layers in which a cholesteric liquid crystal phase is fixed. As shown in FIG. 7, the light emitting screen 10D is irradiated with the light emitted from a light source not shown in the drawing, from the side of the blue light emitting layer 12. Each of first excitation light 20B, second excitation light 22B, and third excitation light 24B radiated to the light emitting screen 10D is circularly polarized light.

Except for using the first selective reflection layer 40B and the second selective reflection layer 42B, the light emitting screen 10D shown in FIG. 7 has the same layers as those of the light emitting screen 10 shown in FIG. 1. Accordingly, the same constituents are marked with the same reference numerals so as not to repeat the description thereof. The following description is mainly focused on the first selective reflection layer 40B and the second selective reflection layer 42B.

(First Selective Reflection Layer 40B and Second Selective Reflection Layer 42B)

Each of the first selective reflection layer 40B and the second selective reflection layer 42B is constituted with a layer in which a cholesteric liquid crystal phase is fixed.

The layer in which a cholesteric liquid crystal phase is fixed is a layer which has a cholesteric liquid crystal structure and selectively reflects right-handed circularly polarized light or left-handed circularly polarized light having a specific wavelength that enters the layer. The cholesteric liquid crystal structure has a plurality of helical structure regions that is formed due to the helical arrangement of a liquid crystal compound. The cholesteric liquid crystal structure selectively reflects, among lights entering the layer along the helical axis of the helical structure region, the circularly polarized light, which has a wavelength included in a wavelength band selectively reflected by the cholesteric liquid crystal structure and has the same direction of optical rotation as that of the helical structure region, and transmits other lights.

The manufacturing method of the light reflection layer in which the cholesteric liquid crystal phase is fixed is not particularly limited. For example, it is possible to use the methods described in JP 1-133003 A, JP 3416302 B, JP 3363565 B, and JP 8-271731 A, and the contents of the documents are incorporated into the present invention. In the present invention, it is preferable to fix the alignment state of the cholesteric liquid crystal phase by means of a curing reaction that proceeds due to irradiation of ultraviolet rays.

As the state in which the liquid crystal phase is "fixed", an embodiment in which the alignment of the liquid crystal compound forming the cholesteric liquid crystal phase is maintained is the most typical and preferable. However, the present invention is not limited to such an embodiment, and specifically means a state in which the reflection layer does not exhibit fluidity, and the fixed alignment state can be stably maintained without changing due to an external field or an external force, generally within a temperature range of 0° C. to 50° C. or within a temperature range of −30° C. to 70° C. under harsher conditions.

In the present invention, a layer in which a cholesteric liquid crystal phase forming a right-handed helix is fixed may be used, or a layer in which a cholesteric liquid crystal phase forming a left-handed helix is fixed may be used. Furthermore, it is preferable that the selective reflection layer has a plurality of pairs of layers in which cholesteric liquid crystal phases forming right-handed and left-handed helices having the same helical pitch are fixed, because the selective reflectance is improved, and the band of the selectively reflected wavelength broadens.

The direction of optical rotation of the cholesteric liquid crystal phase can be adjusted according to the type of the liquid crystal compound or the type of a chiral agent added, and the helical pitch can be adjusted according to the concentration of the materials of the liquid crystal compound and the chiral agent.

The light emitting screen 10D, which includes the first selective reflection layer 40B and the second selective reflection layer 42B constituted with the layer in which the cholesteric liquid crystal phase is fixed, is irradiated with the excitation light composed of circularly polarized light.

More specifically, the blue light emitting layer 12 is irradiated with the first excitation light 20B which is circularly polarized light having the same direction of optical rotation as the direction of optical rotation of the cholesteric liquid crystal in the layer, in which the cholesteric liquid crystal phase is fixed and which constitutes the first selective reflection layer 40B. Most of the first excitation light 20B is absorbed into the blue light emitting layer 12, and blue light is emitted from the blue light emitting layer 12. In contrast, the first excitation light 20B having not been absorbed into the blue light emitting layer 12 is reflected by the first selective reflection layer 40B which is the layer in which the cholesteric liquid crystal phase is fixed. Because the layer in which the cholesteric liquid crystal phase is fixed reflects the circularly polarized light with extremely high efficiency, the color reproducibility and brightness are further improved.

In the same way as the first excitation light 20B, the green light emitting layer 14 is irradiated with the second excitation light 22B such that the direction of optical rotation of the second excitation light 22B becomes identical to the direction of optical rotation of the cholesteric liquid crystal in the layer, in which the cholesteric liquid crystal phase is fixed and which constitutes the second selective reflection layer 42B. The second excitation light 22B having not been absorbed into the green light emitting layer 14 is reflected with high efficiency by the second selective reflection layer 42B which is the layer in which the cholesteric liquid crystal phase is fixed.

In the above embodiment, the amount of the emitted light, which is reflected by each of the selective reflection layers after being emitted from each of the light emitting layers, halves, and therefore the deterioration of brightness is further inhibited. More specifically, for example, when the emission spectrum of the blue light 30 emitted from the blue light emitting layer 12 and the reflection region of the first selective reflection layer 402 partially overlap with each other, the blue light 30 in the overlapping wavelength region is reflected. However, because the first selective reflection layer 40B reflects only one of the right-handed circularly polarized light and the left-handed circularly polarized light, the blue light 30 having a direction of optical rotation different from that of the cholesteric liquid crystal in the first selective reflection layer 40B is transmitted. As a result, the deterioration of brightness is further inhibited.

The method for radiating the circularly polarized excitation light as described above is not particularly limited, and examples thereof include a method of disposing a polarizer and a λ/4 plate between the light emitting screen and the light source apparatus.

In the fifth embodiment, the aforementioned third selective reflection layer may be further disposed in the light emitting screen. In this case, it is preferable that the third selective reflection layer is constituted with the layer in which the cholesteric liquid crystal phase is fixed just like the first selective reflection layer 40B and the second selective reflection layer 42B.

EXAMPLES

Hereinafter, the characteristics of the present invention will be more specifically described based on examples. The materials, the amount of the materials used, the ratio between the materials, the content and procedure of processing, and the like shown in the following examples can be appropriately modified as long as the modification does not depart from the gist of the present invention. Therefore, the scope of the present invention is not limited to the following specific examples.

<Manufacturing Example>

(Preparation of Quantum Dot-Containing Polymerizable Composition)

As a composition for forming a blue light emitting layer, the following quantum dot-containing polymerizable composition 1 was prepared. The composition was filtered through a filter made of polypropylene having a pore size of 0.2 μm, then dried for 30 minutes under reduced pressure, and used as a coating solution.

| Quantum dot-containing polymerizable composition 1 | |
| --- | --- |
| Toluene dispersion of quantum dots 1 (central emission wavelength: 450 nm) | 10 parts by mass |
| Lauryl methacrylate | 80.8 parts by mass |
| Trimethylolpropane triacrylate | 18.2 parts by mass |
| Photopolymerization initiator (IRGACURE 819 (manufactured by BASF Corporation)) | 1 part by mass |

In the above description, the quantum dots 1 in the "toluene dispersion of quantum dots 1" were core/shell-type quantum dots (average particle size: 3 nm, aspect ratio (major axis/minor axis): 1) in which the core and shell were constituted with CdSe and CdS respectively. The concentration of the quantum dots 1 was 1% by mass with respect to the total amount of the toluene dispersion.

A quantum dot-containing polymerizable composition 2 was prepared as a composition for forming a green light emitting layer according to the same procedure as described above, except that a toluene dispersion of quantum dots 2 (central emission wavelength: 540 nm) was used instead of the toluene dispersion of quantum dots 1.

The quantum dots 2 in the "toluene dispersion of quantum dots 2" are core/shell-type quantum dots (average particle size: 5 nm, aspect ratio (major axis/minor axis): 1) in which the core and shell were constituted with CdSe and CdS respectively. The concentration of the quantum dots 2 was 1% by mass with respect to the total amount of the toluene dispersion.

A quantum dot-containing polymerizable composition 3 was prepared as a composition for forming a red light emitting layer according to the same procedure as described above, except that a toluene dispersion of quantum dots 3 (central emission wavelength: 630 nm) was used instead of the toluene dispersion of quantum dots 1.

The quantum dots 3 in the "toluene dispersion of quantum dots 3" are core/shell-type quantum dots (average particle size: 7 nm, aspect ratio (major axis/minor axis): 1) in which the core and shell were constituted with CdSe and CdS respectively. The concentration of the quantum dots 3 was 1% by mass with respect to the total amount of the toluene dispersion.

(Formation of Light Emitting Layer (1))

As a temporary support, a PET (polyethylene terephthalate) film was prepared, and the PET film was coated with the quantum dot-containing polymerizable composition 1 by using a die coater, thereby forming a coating film having a thickness of 50 μm. Thereafter, the PET film on which the coating film had been formed was wound around a backup roller, and a PET film was laminated on the coating film. While being continuously transported in a state in which the coating film was interposed between the PET films, the resultant was passed through a heating zone with a temperature of 100° C. for 3 minutes. Subsequently, by using an air-cooled metal halide lamp (manufactured by EYE GRAPHICS Co., Ltd.) having an output of 160 W/cm, the coating film was cured by being irradiated with ultraviolet rays, thereby forming a blue light emitting layer containing quantum dots. The irradiation amount of the ultraviolet rays was 2,000 mJ/cm$^2$.

A green light emitting layer containing quantum dots was formed according to the same procedure as described above, except that the quantum dot-containing polymerizable composition 2 was used instead of the quantum dot-containing polymerizable composition 1.

Furthermore, a red light emitting layer containing quantum dots was formed according to the same procedure as described above, except that the quantum dot-containing polymerizable composition 3 was used instead of the quantum dot-containing polymerizable composition 1.

(Formation of Selective Reflection Layer)

A dielectric multilayer film for being used as a selective reflection layer was prepared with reference to JP 2011-237510 A. Specifically, the resin layer prepared in Preparation example 1 (refractive index: 1.58) of JP 2011-237510 A was used as a resin layer with a low refractive index, and the resin layer prepared in Preparation example 3 (refractive index: 1.71) of the same document was used as a resin layer with a high refractive index. By using a spin coater (ACT-220DII, manufactured by Active Co., Ltd.), varnish of the resin layer with a low refractive index of Preparation example 1 was dripped onto a PET film, and the PET film was coated with the varnish at 3,000 rpm to 5,000 rpm and then dried, thereby forming a resin layer with a low refractive index. The resin layer with a low refractive index was then coated with varnish of the resin layer with a high refractive index of Preparation example 3 and then dried by the same method as described above, thereby forming a resin layer with a high refractive index. The two layers were regarded as 1 bilayer, and the bilayer was repeatedly laminated on each other 50 times, thereby obtaining a dielectric multilayer film consisting of 50 bilayers.

A film thickness d of each of the resin layer with a low refractive index and the resin layer with a high refractive index was adjusted by the rotary speed of the spin coater such that the film thickness d was equal to $\lambda/(4n)$. Herein, $\lambda$ represents a central reflection wavelength, and n represents a refractive index.

In Example 1 which will be described later, the following first and second selective reflection layers X were used. In Example 3, the following first to third selective reflection layers X were used.

In the formed first selective reflection layer X, the wavelength (central reflection wavelength) at which the reflectance was maximized was 400 nm, and the half-band width was 30 nm.

In the formed second selective reflection layer X, the wavelength (central reflection wavelength) at which the reflectance was maximized was 500 nm, and the half-band width was 30 nm.

In the formed third selective reflection layer X, the wavelength (central reflection wavelength) at which the reflectance was maximized was 590 nm, and the half-band width was 30 nm.

In Example 2 which will be described later, the following first and second selective reflection layers Y were used.

In the formed first selective reflection layer Y, the wavelength (central reflection wavelength) at which the reflectance was maximized was 380 nm, and the half-band width was 30 nm.

In the formed second selective reflection layer Y, the wavelength (central reflection wavelength) at which the reflectance was maximized was 420 nm, and the half-band width was 30 nm.

Example 1

From the PET films having the respective light emitting layers (quantum dot-containing light emitting layers) manufactured as above and from the PET films having the respective selective reflection layers (the first and second selective reflection layers X), the respective light emitting layers and selective reflection layers were peeled and transferred, and the respective light emitting layers and selective reflection layers were bonded to each other in order shown in FIG. 1. Furthermore, two sheets of films with a barrier layer that had a COP film as a support were prepared, and all the layers bonded to each other as above were interposed between the two sheets of films via an adhesive layer, thereby preparing a light emitting screen.

Herein, between the respective layers (between the light emitting layers and the selective reflection layers), an adhesive layer for securing adhesiveness between the respective layers was disposed.

Comparative Example 1

Figure 8:
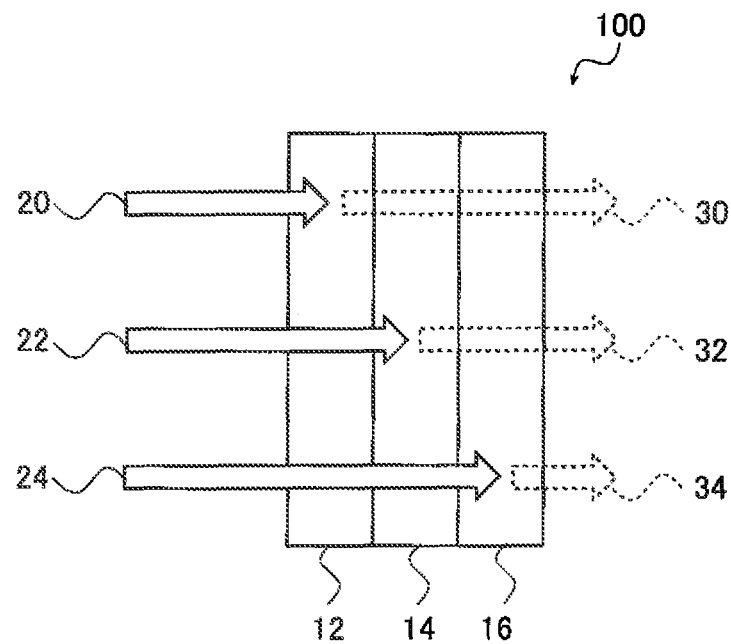
FIG. 8 is a cross-sectional view of a light emitting screen in the prior art.

A light emitting screen was prepared according to the same procedure as in Example 1, except that the selective reflection layers were not used. The light emitting screen did not include the selective reflection layers, and the respective light emitting layers were constituted in the same manner as shown in FIG. 8.

Example 2

A light emitting screen was prepared according to the same procedure as in Example 1, except that the respective light emitting layers containing quantum rods (a blue light emitting layer containing quantum rods 1, a green light emitting layer containing quantum rods 2, and a red light emitting layer containing quantum rods 3) that will be described later were used instead of the respective light emitting layers containing the quantum dots, and the first and second selective reflection layers Y were used instead of the first and second selective reflection layers X respectively. The structure of the respective light emitting layers and selective reflection layers of the prepared light emitting screen was the same as the structure shown in FIG. 3.

(Formation of Light Emitting Layer (2))

A blue light emitting layer containing quantum rods 1 was prepared according to the same procedure as in the aforementioned (Preparation of quantum dot-containing polymerizable composition) and (Formation of light emitting layer (1)), except that a toluene dispersion of quantum rods 1 (central emission wavelength: 450 nm) was used instead of the toluene dispersion of quantum dots 1.

The quantum rods 1 in the "toluene dispersion of quantum rods 1" were core/shell-type quantum rods (major axis: 9 nm, minor axis: 3 nm, aspect ratio (major axis/minor axis): 3) in which the core and shell were constituted with CdSe and CdS respectively. The concentration of the quantum rods 1 was to by mass with respect to the total amount of the toluene dispersion.

A green light emitting layer containing quantum rods 2 was prepared according to the same procedure as in the aforementioned (Preparation of quantum dot-containing polymerizable composition) and (Formation of light emitting layer (1)), except that a toluene dispersion of quantum rods 2 (central emission wavelength: 540 nm) was used instead of the toluene dispersion of quantum dots 1.

The quantum rods 2 in the "toluene dispersion of quantum rods 2" were core/shell-type quantum rods (major axis: 20 nm, minor axis: 5 nm, aspect ratio (major axis/minor axis): 4) in which the core and shell were constituted with CdSe and CdS respectively. The concentration of the quantum rods 2 was 1% by mass with respect to the total amount of the toluene dispersion.

A red light emitting layer containing quantum rods 3 was prepared according to the same procedure as in the aforementioned (Preparation of quantum dot-containing polymerizable composition) and (Formation of light emitting layer (1)), except that a toluene dispersion of quantum rods 3 (central emission wavelength: 630 nm) was used instead of the toluene dispersion of quantum dots 1.

The quantum rods 3 in the "toluene dispersion of quantum rods 3" were core/shell-type quantum rods (major axis: 40 nm, minor axis: 6 nm, aspect ratio (major axis/minor axis): 7) in which the core and shell were constituted with CdSe and CdS respectively. The concentration of the quantum rods 3 was 1% by mass with respect to the total amount of the toluene dispersion.

Example 3

A light emitting screen was prepared according to the same procedure as in Example 1, except that a PET film having the third selective reflection layer X was further used. The structure of the respective light emitting layers and selective reflection layers of the prepared light emitting screen was the same as the structure shown in FIG. 5.

Example 4

A light emitting screen was prepared according to the same procedure as in Example 2, except that selective reflection layers (reflection-type polarizers) prepared according to the procedure which will be described later were used as the first to third selective reflection layers. The structure of the respective light emitting layers and selective reflection layers of the prepared light emitting screen was the same as the structure shown in FIG. 6 except that the third selective reflection layer is added.

(Preparation of Selective Reflection Layer (Reflection-Type Polarizer))

First to third selective reflection layers Z as reflection-type polarizers were manufactured by appropriately changing the total thickness thereof with reference to IDW/AD' 12, p. 985 to 988 (2012). The respective selective reflection layers were prepared on a PET film which was a temporary support.

In the formed first selective reflection layer Z, the wavelength (central reflection wavelength) at which the reflectance was maximized was 380 nm, and the half-band width was 30 nm.

In the formed second selective reflection layer Z, the wavelength (central reflection wavelength) at which the reflectance was maximized was 420 nm, and the half-band width was 30 nm.

In the formed third selective reflection layer Z, the wavelength (central reflection wavelength) at which the reflectance was maximized was 500 nm, and the half-band width was 30 nm.

Example 5

A light emitting screen was prepared according to the same procedure as in Example 2, except that selective reflection layers (layers in which a cholesteric liquid crystal phase is fixed) prepared according to the procedure which will be described later were used as the first to third selective reflection layers. The structure of the respective light emitting layers and selective reflection layers of the prepared light emitting screen was the same as the structure shown in FIG. 7 except that the third selective reflection layer is added.

(Preparation of Layer in which Cholesteric Liquid Crystal Phase is Fixed)

(Formation of First Selective Reflection Layer W)

A PET film was prepared as a temporary support and continuously subjected to rubbing processing. The direction of the rubbing processing was made parallel to the longitudinal direction of the film.

A composition having the following makeup was dissolved in MEK to prepare a coating solution. In the preparation of the coating solution, the concentration of the composition was adjusted such that a dry film thickness of 2.5 μm was obtained. The temporary support having undergone the rubbing processing was coated with the coating solution by using a bar, and the coating solution was allowed to mature by being heated at 85° C. for 1 minute, thereby obtaining a uniform alignment state. Thereafter, the coating film was kept at 55° C. and irradiated with ultraviolet rays at 300 mJ/cm² by using a metal halide lamp, thereby forming a first selective reflection layer W.

In the formed first selective reflection layer W, the wavelength (central reflection wavelength) at which the reflectance was maximized was 380 nm, and the half-band width was 30 nm.

(Makeup of Composition for Forming First Selective Reflection Layer)

| | |
|---|---|
| Compound 11 | 83 parts by mass |
| Rod-like compound 18-1 | 15 parts by mass |
| Rod-like compound 18-2 | 2 parts by mass |
| Fluorine-based horizontal alignment agent 1 | 0.05 parts by mass |
| Fluorine-based horizontal alignment agent 2 | 0.01 parts by mass |
| Dextrorotatory chiral agent LC756 (manufactured by BASF Corporation) | The amount that results in the central reflection wavelength (approximately 8.3 parts by mass) |
| Polyfunctional monomer A-TMMT (manufactured by SHIN-NAKAMURA CHEMICAL CO., LTD.) | 1 part by mass |
| Polymerization initiator IRGACURE 819 (manufactured by BASF Corporation) | 3 parts by mass |

Compound 11

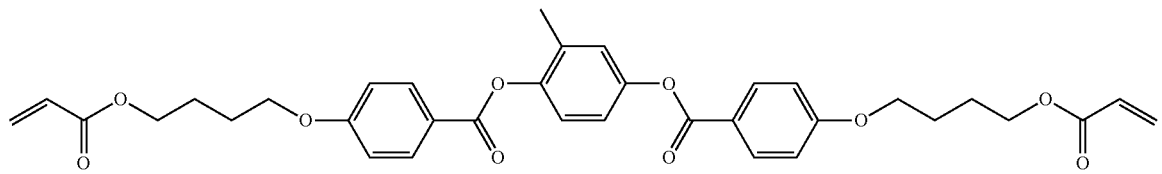 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Compound 18-1

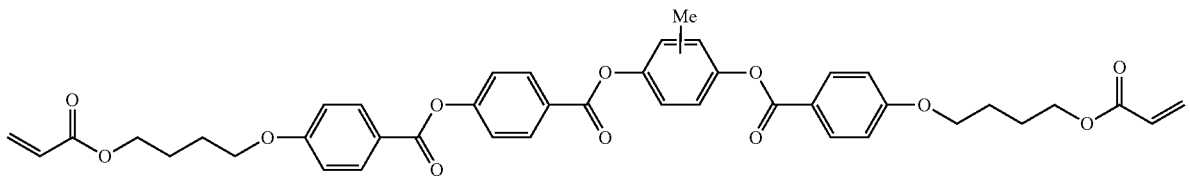

Rod-Like Compound 18-2

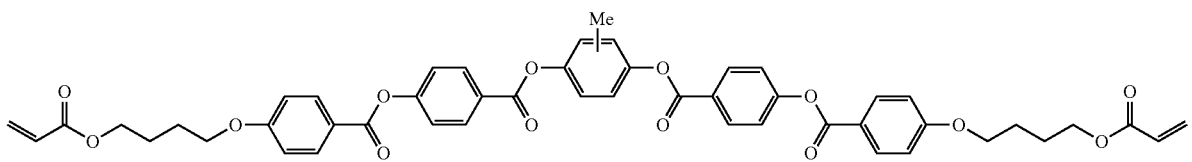

Fluorine-Based Horizontal Alignment Agent 1

Rf—⟨benzene⟩—C(O)—O—⟨methylbenzene⟩—O—C(O)—⟨benzene⟩—Rf

Rf = *—O—CH$_2$CH$_2$—O—CH$_2$CH$_2$—C$_6$F$_{13}$

Fluorine-Based Horizontal Alignment Agent 2

Rf'—⟨benzene with three Rf' substituents⟩—C(O)—O—⟨methylbenzene⟩—O—C(O)—⟨benzene with three Rf' substituents⟩—Rf'

Rf' = *—O—C(O)—CH$_2$CH$_2$—C(O)—O—CH$_2$CH$_2$—C$_6$F$_{13}$ (Formation of Second and Third Selective Reflection Layers)

Second and third selective reflective layers W exhibiting the following characteristics were formed according to the same procedure as in the aforementioned (Formation of first selective reflection layer), except that the dry film thickness and the amount of the dextrorotatory chiral agent LC756 (manufactured by BASF Corporation) were adjusted and modified.

In the formed second selective reflection layer W, the wavelength (central reflection wavelength) at which the reflectance was maximized was 420 nm, and the half-band width was 30 nm.

In the formed third selective reflection layer W, the wavelength (central reflection wavelength) at which the reflectance was maximized was 500 nm, and the half-band width was 30 nm.

<Preparation of Display Apparatus>

Each of the light emitting screens prepared in Examples 1 to 3 and Comparative example 1 was combined with a light source in which an ND filter (nonpolarizing filter) was mounted on a DLP projector light source, thereby preparing display apparatuses. The DLP projector was used with reference to the structure shown in FIG. 9 of Non-Patent Document 1.

The light emitting screen prepared in Example 4 was combined with a light source in which a linearly polarizing filter was mounted on the aforementioned DLP projector, thereby preparing a display apparatus. The polarizing direction of the linearly polarized light radiated from the light source was orthogonal to the transmission axis of the reflection-type polarizer constituting each of the selective reflection layers in the light emitting screen.

The light emitting screen prepared in Example 5 was combined with a light source in which a circularly polarizing filter was mounted on the aforementioned DLP projector, thereby preparing a display apparatus. The direction of optical rotation of the circularly polarized light radiated from the light source was the same as the direction of optical rotation of the cholesteric liquid crystal in the layer, in which the cholesteric liquid crystal phase was fixed and which constituted the selective reflection layer in the light emitting screen.

<Evaluation>

(Evaluation of Transparency)

For evaluating transparency, the display apparatus was placed in the environment of a general office and caused to display images, and at this time, a sensory test was performed. The transparency was evaluated according to the following criteria.

A: When the display apparatus is watched as a transparent display, it looks extremely transparent.

B: When the display apparatus is watched as a transparent display, it does not look slightly transparent but looks slightly dark.

C: When the display apparatus is watched as a transparent display, it does not look transparent but looks dark.

(Bright Point Defect)

For evaluating bright point defect, the display apparatus was placed in the environment of a general office and used, and at this time, a sensory test was performed. The bright point defect was evaluated according to the following criteria.

A: No bright point is observed.

B: Bright points are slightly observed (approximately several to tens of bright points on a single screen).

C: Bright points are markedly observed (more than tens of bright points on a single screen).

(Color Reproducibility)

For evaluating color reproducibility, the display apparatus was placed in the environment of a general office and caused to display RGB colors. At this time, the chromaticity coordinates thereof were measured using a luminance colorimeter BM-5A manufactured by TOPCON TECHNOHOUSE CORPORATION, and the color reproducibility was calculated as an NTSC ratio. The color reproducibility was evaluated according to the following criteria.

A: The NTSC ratio is greater than 100%.

B: The NTSC ratio is equal to or greater than 90% and equal to or less than 100%.

C: The NTSC ratio is equal to or greater than 80% and less than 90%.

D: The NTSC ratio is equal to or greater than 70% and less than 80%.

E: The NTSC ratio is less than 70%.

(Brightness)

For evaluating brightness, the display apparatus was placed in the environment of a general office and caused to display white images. At this time, the chromaticity coordinates thereof were measured using a luminance colorimeter BM-5A manufactured by TOPCON TECHNOHOUSE CORPORATION, and the brightness was determined. The brightness was evaluated according to the following criteria (the brightness was evaluated as a value relative to the brightness of Comparative example 1).

A: The brightness is greater than 2.0.

B: The brightness is greater than 1.1 and equal to or less than 2.0.

C: The brightness is greater than 1.0 and equal to or less than 1.1.

D: The brightness is equal to or less than 1.0.

In Table 1, "Present (polarizer)" means that a reflection-type polarizer was used as a selective reflection layer.

Furthermore, "Present (liquid crystal phase)" means that a layer in which a cholesteric liquid crystal phase was fixed was used as a selective reflection layer.

TABLE 1

| | | Comparative example 1 | Example 1 | Example 2 | Example 3 | Example 4 | Example 5 |
|---|---|---|---|---|---|---|---|
| Constitution | Light emitting material — Blue light emitting layer | Quantum dot | Quantum dot | Quantum dot | Quantum dot | Quantum rod | Quantum rod |
| | Light emitting material — Green light emitting layer | Quantum dot | Quantum dot | Quantum rod | Quantum dot | Quantum rod | Quantum rod |
| | Light emitting material — Red light emitting layer | Quantum dot | Quantum dot | Quantum rod | Quantum dot | Quantum rod | Quantum rod |
| | Wavelength of excitation light (nm) — First excitation light | 400 | 400 | 380 | 400 | 380 | 380 |
| | Wavelength of excitation light (nm) — Second excitation light | 500 | 500 | 420 | 500 | 420 | 420 |
| | Wavelength of excitation light (nm) — Third excitation light | 590 | 590 | 500 | 590 | 500 | 500 |
| | Wavelength of absorption edge of each layer (nm) — Blue light emitting layer | 460 | 460 | 400 | 460 | 400 | 400 |
| | Wavelength of absorption edge of each layer (nm) — Green light emitting layer | 550 | 550 | 440 | 550 | 440 | 440 |
| | Wavelength of absorption edge of each layer (nm) — Red light emitting layer | 640 | 640 | 540 | 640 | 540 | 540 |
| | Central emission wavelength of each layer (nm) — Blue light emitting layer | 450 | 450 | 450 | 450 | 450 | 450 |
| | Central emission wavelength of each layer (nm) — Green light emitting layer | 540 | 540 | 540 | 540 | 540 | 540 |
| | Central emission wavelength of each layer (nm) — Red light emitting layer | 630 | 630 | 630 | 630 | 630 | 630 |
| | First selective reflection layer — Presence or absence | Absent | Present | Present | Present | Present (polarizer) | Present (liquid crystal phase) |
| | First selective reflection layer — Central reflection wavelength (nm) | — | 400 | 380 | 400 | 380 | 380 |
| | Second selective reflection layer — Presence or absence | Absent | Present | Present | Present | Present (polarizer) | Present (liquid crystal phase) |
| | Second selective reflection layer — Central reflection wavelength (nm) | — | 500 | 420 | 500 | 420 | 420 |
| | Third selective reflection layer — Presence or absence | Absent | Absent | Absent | Present | Present (polarizer) | Present (liquid crystal phase) |
| | Third selective reflection layer — Central reflection wavelength (nm) | — | — | — | 590 | 500 | 500 |
| Evaluation | Transparency | A | A | A | A | A | A |
| | Bright point defect | A | A | A | A | A | A |
| | Color reproducibility | E | C | B | C | A | A |
| | Brightness | C | B | A | A | A | A |

As shown in Table 1, it was confirmed that when the light emitting screen of the present invention was used, intended effects were obtained.

Particularly, from the comparison between Examples 1 and 2, it was confirmed that the characteristics (color reproducibility and brightness) were further improved when quantum rods were used.

From the comparison between Examples 1 and 3, it was confirmed that when the third selective reflection layer was further disposed in the light emitting screen, the characteristic (brightness) was further improved.

From the comparison between Examples 2 and 4, it was confirmed that the characteristic (color reproducibility) was further improved when the reflection-type polarizer was used as the selective reflection layer.

From the comparison between Examples 2 and 5, it was confirmed that the characteristic (color reproducibility) was further improved when the layer in which a cholesteric liquid crystal phase was fixed was used as the selective reflection layer.

In contrast, when the light emitting screen not having a predetermined constitution was used, intended effects were not obtained.

What is claimed is:

1. A light emitting screen comprising:
    a blue light emitting layer which emits blue light by being excited with first excitation light;
    a green light emitting layer which is disposed on the blue light emitting layer and emits green light by being excited with second excitation light having a wavelength longer than a wavelength of an absorption edge on a long-wavelength side of an absorption spectrum of the blue light emitting layer;
    a red light emitting layer which is disposed on the green light emitting layer and emits red light by being excited with third excitation light having a wavelength longer than a wavelength of an absorption edge on a long-wavelength side of an absorption spectrum of the green light emitting layer;
    a first selective reflection layer which is disposed between the blue light emitting layer and the green light emitting layer and reflects the first excitation light; and
    a second selective reflection layer which is disposed between the green light emitting layer and the red light emitting layer and reflects the second excitation light,
    wherein the blue light emitting layer, the green light emitting layer, and the red light emitting layer contain quantum rods or quantum dots.

2. The light emitting screen according to claim 1, further comprising a third selective reflection layer which is disposed on the side of the red light emitting layer that is opposite to the green light emitting layer and reflects the third excitation light.

3. The light emitting screen according to claim 2,
    wherein the blue light emitting layer, the green light emitting layer, and the red light emitting layer contain quantum rods.

4. The light emitting screen according to claim 2,
    wherein each of the first selective reflection layer and the second selective reflection layer is one selected from the group consisting of a dielectric multilayer film, a reflection-type polarizer, and a layer in which a cholesteric liquid crystal phase is fixed.

5. A display apparatus comprising:
    the light emitting screen according to claim 2; and a light source apparatus which emits the first excitation light, the second excitation light, and the third excitation light.

6. The light emitting screen according to claim 1,
wherein the blue light emitting layer, the green light emitting layer, and the red light emitting layer contain quantum rods.

7. The light emitting screen according to claim 6,
wherein each of the first selective reflection layer and the second selective reflection layer is one selected from the group consisting of a dielectric multilayer film, a reflection-type polarizer, and a layer in which a cholesteric liquid crystal phase is fixed.

8. A display apparatus comprising:
the light emitting screen according to claim 6; and
a light source apparatus which emits the first excitation light, the second excitation light, and the third excitation light.

9. The light emitting screen according to claim 1,
wherein each of the first selective reflection layer and the second selective reflection layer is one selected from the group consisting of a dielectric multilayer film, a reflection-type polarizer, and a layer in which a cholesteric liquid crystal phase is fixed.

10. A display apparatus comprising:
the light emitting screen according to claim 9; and
a light source apparatus which emits the first excitation light, the second excitation light, and the third excitation light.

11. A display apparatus comprising:
the light emitting screen according to claim 1; and
a light source apparatus which emits the first excitation light, the second excitation light, and the third excitation light.

12. The display apparatus according to claim 11,
wherein the light source apparatus has a first light source emitting the first excitation light, a second light source emitting the second excitation light, and a third light source emitting the third excitation light.

13. The display apparatus according to claim 12,
wherein each of the first excitation light, the second excitation light, and the third excitation light is linearly polarized light, and
the first selective reflection layer and the second selective reflection layer are reflection-type polarizers.

14. The display apparatus according to claim 12,
wherein each of the first excitation light, the second excitation light, and the third excitation light is circularly polarized light, and
the first selective reflection layer and the second selective reflection layer are layers in which a cholesteric liquid crystal phase is fixed.

15. The display apparatus according to claim 11,
wherein each of the first excitation light, the second excitation light, and the third excitation light is linearly polarized light, and
the first selective reflection layer and the second selective reflection layer are reflection-type polarizers.

16. The display apparatus according to claim 11,
wherein each of the first excitation light, the second excitation light, and the third excitation light is circularly polarized light, and
the first selective reflection layer and the second selective reflection layer are layers in which a cholesteric liquid crystal phase is fixed.

* * * * *